United States Patent

Hsu

[19]

[11] Patent Number: 6,089,089
[45] Date of Patent: Jul. 18, 2000

[54] MULTI-ELEMENT MICRO GYRO

[75] Inventor: Ying W. Hsu, Huntington Beach, Calif.

[73] Assignee: Microsensors, Inc., Costa Mesa, Calif.

[21] Appl. No.: 09/301,847

[22] Filed: Apr. 29, 1999

Related U.S. Application Data

[63] Continuation of application No. 08/943,305, Oct. 14, 1997, abandoned.

[51] Int. Cl.$^7$ .................................................. G01C 19/00
[52] U.S. Cl. ........................................ 73/504.12; 73/1.77
[58] Field of Search ........................... 73/504.02, 504.12, 73/504.13, 514.17, 514.18, 1.77

[56] References Cited

U.S. PATENT DOCUMENTS

5,728,936  3/1998  Lutz ...................................... 73/504.14

*Primary Examiner*—Hezron Williams
*Assistant Examiner*—Richard A. Moller
*Attorney, Agent, or Firm*—Myers, Dawes & Andras LLP

[57] ABSTRACT

A micro-gyro device is disclosed combining a first element which oscillates linearly in a plane along a first direction, ad a second element which receives Coriolis force acting in the same plane along a second direction perpendicular to the first direction, so arranged that said Coriolis force is transmitted from one element to the other without any substantial transfer of motion of either element to the other in its own direction of motion. In other words, the masses of the two elements operate independently of one another, providing improved performance, and individual adjustability to compensate for any manufacturing imprecision. The rate axis, around which is measured angular speed of the micro-gyro device due to exterior forces, is perpendicular to the plane of the first and second elements. The presently-preferred device combines an outer rectangular ring, which oscillates along the drive direction, with an inner plate, which oscillates along the sensing direction, whenever external rotating motion occurs about the rate axis. A unitary micro-gyro structure is disclosed in which a monolithic substrate supports three micro-gyro devices, each of which measures angular speed of the structure around a different rate axis, which is perpendicular to each of the other two rate axes.

22 Claims, 7 Drawing Sheets

MULTI-ELEMENT MICRO GYRO

This application is a continuation-in-part of U.S. Application No. 09/166,166,458 filed on Oct. 5, 1998 and issued as U.S. Pat. No. 5,955,668 on Sep. 21, 1999, which application is a continuation-in-part of U.S. Application No. 08/870,812 filed on Jun. 6, 1997 and now abandoned.

This application is a continuation of Application Ser. No. 08/943,305, filed Oct. 14, 1997 now abandoned.

BACKGROUND OF THE INVENTION

This invention relates to sensing devices which utilize the gyroscopic principle, i.e., measuring the Coriolis force created by the conservation of momentum of a moving body. Specifically, the invention concerns devices called micro-gyros, which are small and inexpensive. They rely on conservation of momentum of a structure having limited oscillation motion. They are able to withstand rough environments for long periods of time.

In this field, the terms used to describe the directions of motions and of forces can be confusing. Applicant in describing and claiming the present invention will refer to the three separate directions (which are orthogonally related to one another) as follows: (a) the driven element, which is caused to oscillate (vibrate) at a predetermined, arbitrary rate inside the gyro, moves in a linear drive direction; (b) the velocity of the gyro environment, which is to be determined by the gyro, is around the rate axis; and (c) the Coriolis force, which is a function of the velocity of the gyro environment, is measured by motion of a sensing element in an output direction.

Common assignee Application Ser. No. 08/870,812 relates to a micro-gyro which "separates the mass (momentum of inertia) of the constant motion element driven to oscillate around the drive axis from the mass (momentum of inertia) of the variable motion sensing element which creates the measured force". It accomplishes that result by "using: (a) an outer ring-shaped element which oscillates around the drive axis, and (b) an inner disk-shaped element which oscillates, or rocks, around the output axis as a result of the Coriolis effect". Its dual-element structure "permits the ring and the disk to be excited independently, so that each can be dynamically compensated for manufacturing tolerances by counterbalancing".

Lutz U.S. Pat. No. 5,604,312 shows a rate-of-rotation sensor which uses "an oscillatory mass" moving in a linear vibrating direction, and "a deflectable mass" caused by Coriolis force to move in a linear vibrating direction perpendicular to the motion of the oscillatory mass. Measurement of the Coriolis effect is used to determine angular velocity of the entire sensor around a rate axis, which is perpendicular to the linear vibrating directions of both masses.

The micro-gyro of the common assignee application is able to determine the external rate of rotation around either of the two (X and Y) axes which lie in the plane of the micro-gyro, but not around the third (Z) axis, which is perpendicular to the plane of the micro-gyro. The micro-gyro of the present application, like the sensor of the Lutz patent, is able to determine rate of rotation around the Z-axis, which is perpendicular to the plane of the micro-gyro.

SUMMARY OF THE INVENTION

The present invention, like Application S/N 08/870,812, separates the mass of the "constant motion element" from the mass of the "variable motion sensing element". Like Lutz U.S. Pat. No. 5,604,312, it may have an essentially rectangular arrangement, and uses perpendicular linear forces of an "oscillatory mass", which creates the driving vibrations, and a "deflectable mass", whose vibrations are measured to quantify the angular velocity of the gyro around the rate, or Z, axis.

Differences of major significance between the micro-gyro of this invention and the sensor disclosed in the Lutz patent are that in the present invention the two masses lie in the same plane, and that these movements are independent of one another. In the Lutz patent, the deflectable mass is mounted on top of the oscillatory mass. The Lutz structure is significantly more difficult and costly to manufacture, and inherently less precise in its structure, because of its two-tier design. Also its arrangement prevents independent movement of the two masses, because the deflectable mass is constrained to move with the deflectable mass on which it is mounted.

The present invention may have its first moving element formed with an open center, i.e., formed as a rectangular "ring", while the second moving element, formed as a rectangular "plate", may be located within the open center area of the first element. The outer element, having greater mass, is the oscillatory mass, and the inner element is the deflectable mass, which is moved by the Coriolis force.

An important practical advantage of the present invention is its manufacturing process, in which the two masses may be simultaneously formed by deposition of material on the substrate, followed by photolithography steps to define the separate elements.

In the present invention, the two masses are connected to, and supported by, anchors formed on the substrate. The connecting members are flexures (or links) which are compliant, i.e., permit relatively free motion, in the desired direction, and which are very stiff, i.e., permit substantially zero motion, in other directions. The purpose is to have a maximum transmission of vibration (oscillation) energy solely in the appropriate direction.

A preferred arrangement has one or more anchors supporting both the inner sensing element and the outer driving element. Each anchor is connected by a flexure to the inner element to support the inner element, while permitting it to oscillate in a linear direction. Each anchor-connected flexure is connected by a flexure to the outer element, in order to support the outer element, and also to transmit Coriolis force to the inner element. The driving element is driven to oscillate in a direction which is co-planar with, but perpendicular to, the force on the inner element.

DETAILED DESCRIPTION OF SPECIFIC EMBODIMENTS

Figure 1:
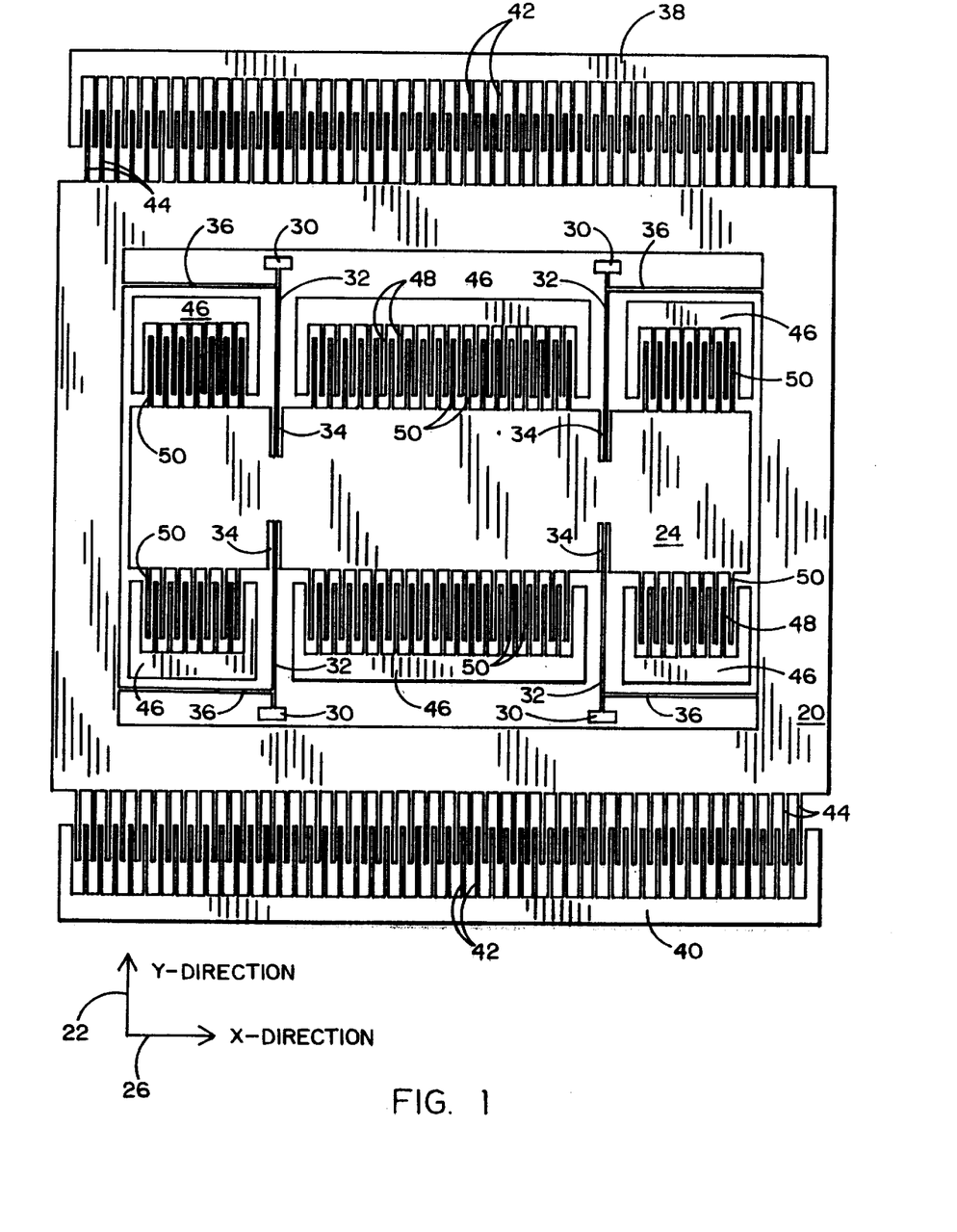
FIG. 1 is a simplified plan view showing the driving element and the sensing element of a micro-gyro.

FIG. 1 is a simplified plan view of the linearly movable parts lying in the operating plane of the micro-gyro. An outer element 20 functions as the driving mass of the gyro. It is caused to oscillate (vibrate) at a pre-determined rate on the line indicated by the arrow 22 marked "Y-Direction". An inner element 24 functions as the sensing mass of the micro-gyro. It is caused by Coriolis force to oscillate (vibrate) on the line indicated by the arrow 26 marked "X-Direction". Both elements 20 and 24 move in the plane of the drawing. Vibration of outer element 20 is continuous. Vibration of inner element 24 only occurs when Coriolis force is present, which is created when the entire micro-gyro is caused by external force to move around a rate axis perpendicular to the plane of the drawing. Such rotational movement causes Coriolis force, which is transmitted from outer element 20 to inner element 24. The Coriolis force is very small; so its correct measurement requires extreme precision and low noise. The Coriolis measurement is used to determine the speed of rotation (angular motion) of the micro-gyro around the rate axis.

Figure 3:
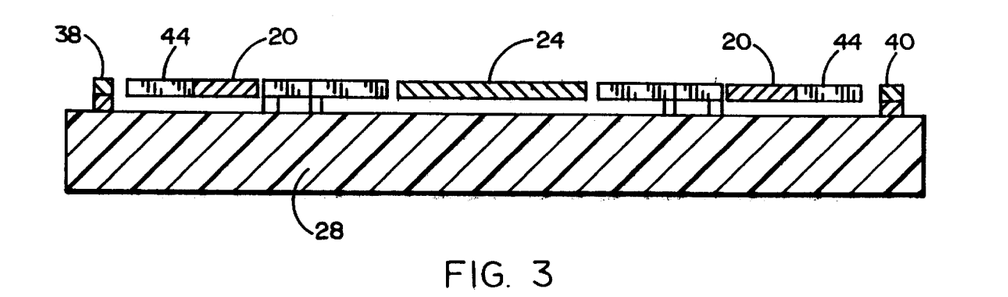
FIG. 3 is a cross-section taken on line 3—3 of FIG. 2.

The outer element 20 and inner element 24 of the gyro are supported on, and suspended above, a substrate 28, which is shown in FIG. 3. The substrate 28 may be formed of any suitable material, e.g., silicon, quartz, nickel, other metals or metal alloys, ceramic. In the present design, silicon has been chosen.

Figure 2:
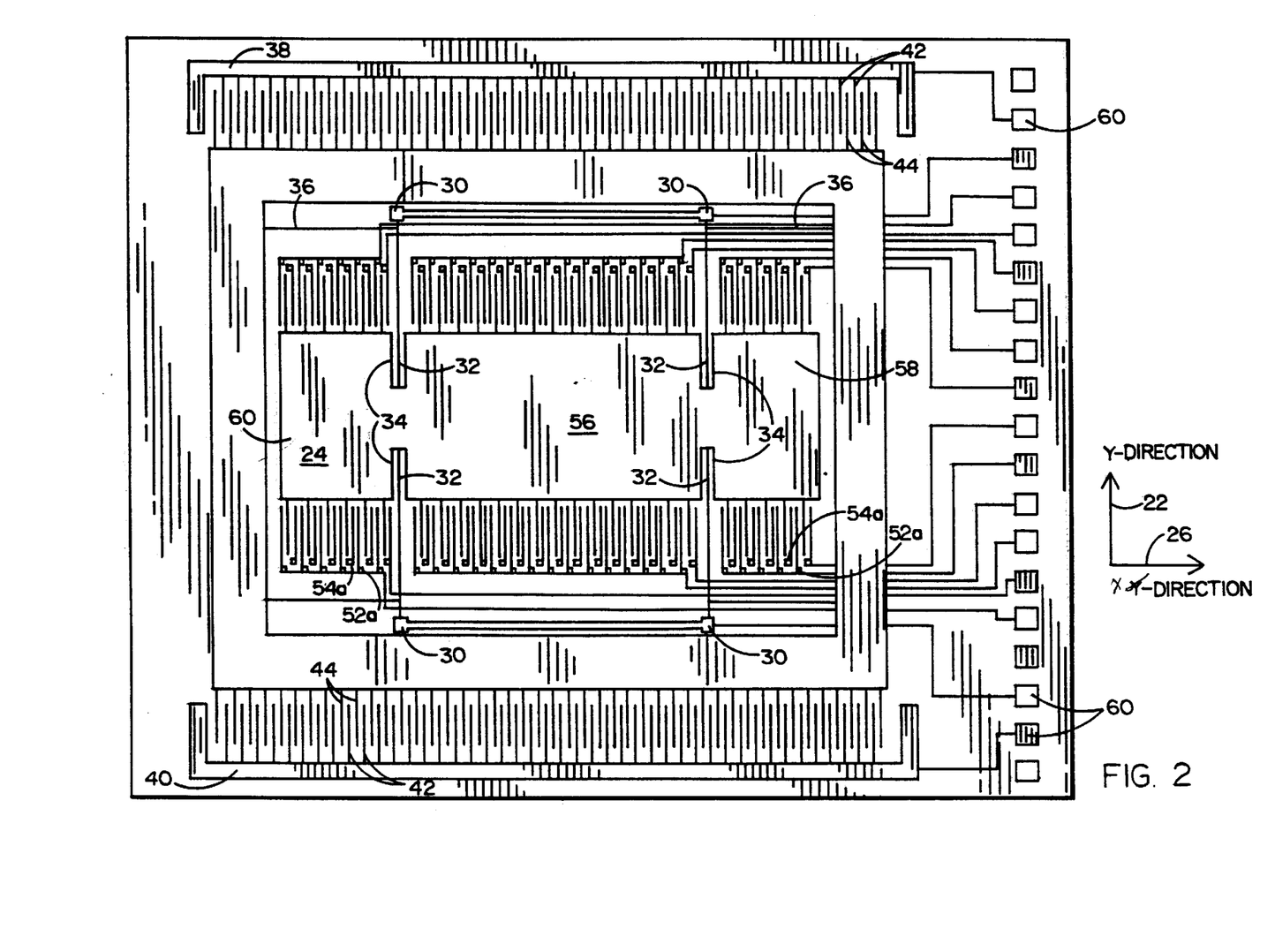
FIG. 2 is a more detailed plan view of the same micro-gyro.

The drawings show four anchors (posts) 30 mounted on the substrate 28, and connected to the inner and outer movable elements 20 and 24. Each anchor 30 is connected to the inner element 24 by a flexure (link) 32, which allows movement of element 24 in the X-direction, but prevents its movement in the Y-direction. In order to accommodate the desired length of flexures 32 within a compact gyro structure, the inner element 24 has four notches 34, into each of which extends a flexure 32. The flexures 32 are very narrow (e.g., three microns) and quite long, in order not to restrict X-direction motion of element 24.

Four flexures 36 support outer element 20 and transmit Coriolis force from outer element 20 to inner element 24. Each flexure 36 is connected at its inner end to one of the flexures 32, near the connection of that flexure to its anchor 30. The flexures 36 are designed to allow vibration of outer element 20 in the Y-direction, while preventing its motion in the X-direction. Each flexure 36 does transmit Coriolis force to the inner element 24, thereby tending to cause motion of element 24 in the X-direction. The location of the connection between each flexure 36 and its connected flexure 32 is such that the Coriolis force is transmitted without compromising the independence of motion of the inner and outer elements 24 and 20. Flexures 32 and 36 are formed of resilient material which exerts a spring force tending to return the flexures toward their center location after flexing.

Various means are available to create driving force on the outer element, e.g., electrostatic, magnetic, piezoelectric. In the preferred version, electrostatic forces are used., in the form of a comb drive. Two electrodes 38 and 40, supported on substrate 28, are located on opposite sides of outer element 20. Each of the electrodes 38 and 40 has a multiplicity of fingers (or comb teeth) 42 extending inwardly toward element 20; and element 20 has a multiplicity of fingers (or comb teeth) 44 extending outwardly toward the adjacent electrode, and located between adjacent fingers 42 on the electrode. This arrangement of alternating fingers 42 and 44 multiplies the effectiveness of the applied voltages in creating Y-direction vibration of outer element 20. An intermediate voltage is applied to the element 20, and alternating higher and lower voltages (180° out of phase) are applied to the electrodes 38 and 40, in order to vibrate element 20. For example, the voltage on element 20 may be held at 6 volts, while the electrode 38 alternates between 10 volts and 2 volts, and electrode 40 alternates between 2 volts and 10 volts. Such voltages are supplied via terminals supported on the substrate, and connected both to the appropriate gyro-elements and to exterior voltage sources.

The purpose of the micro-gyro, i.e., measuring the angular velocity of the gyro-package around rate axis Z, is accomplished by sensing the Coriolis force tending to move inner plate element 24 in the X-direction. Its motion, or tendency to move, can be sensed in various ways, e.g., changes in capacitance, or piezoelectric, magnetic or optical sensing. In the illustrated preferred embodiment, capacitance is the sensing medium.

FIG. 1, which is schematic but not precise, shows six electrodes 46, each having a multiplicity of inwardly extending fingers 48, which are arranged in alternating relationship with a multiplicity of fingers 50 extending outwardly from inner plate element 24. The actual arrangement is shown in FIG. 2, and is best understood from FIG. 4, a close-up of a small portion of the capacitance-sensing structure which detects the Coriolis force acting on inner plate element 24.

Figure 4:
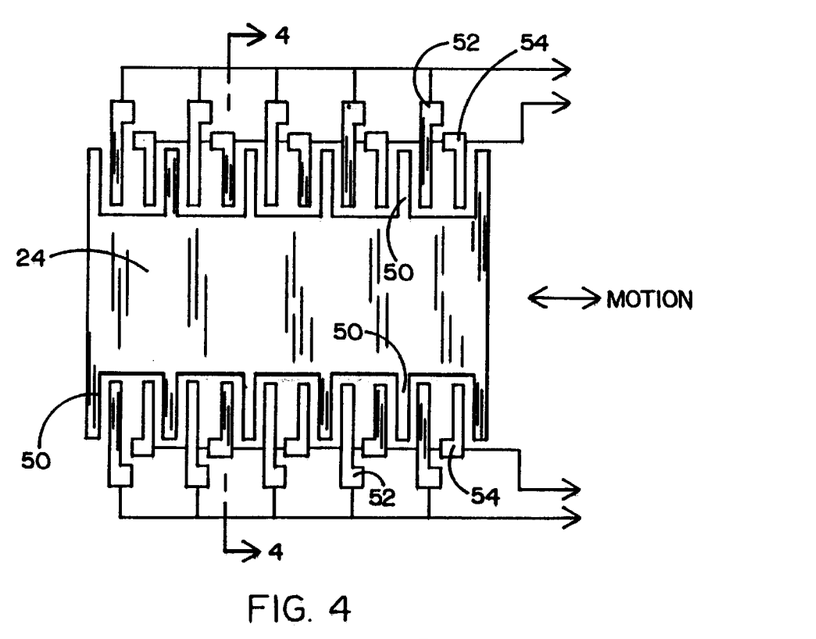
FIG. 4 is a close-up, showing a small portion of the Coriolis sensing structure.
Figure 5:
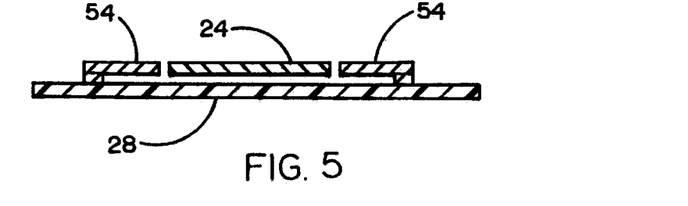
FIG. 5 is a cross-section taken on line 5—5 of FIG. 4.

As seen in FIGS. 2 and 4, a multiplicity of electrodes 52 and 54, arranged in pairs, are mounted on the substrate, and electrically connected to detection electronics. The electrodes 52 and 54 form pairs of parallel capacitors. The inner plate element 24 has outwardly extending fingers 50, with each pair 52/54 of electrodes located between adjacent fingers 50. When the distance between each finger 50 and the adjacent electrodes 52 and 54 changes, the value of capacitance changes. This capacitance change can be measured by using suitable electrical circuits. The sensing electrodes 52 and 54 in each pair operate in the opposite sense, i.e., when one capacitor increases, the other decreases. This sensing of capacitance provides differential sensing, which results in improved sensitivity. In the differential mode, as opposed to the absolute mode, the effects of environmental and electrical noise are drastically reduced, i.e., canceled out. All effects that affect both capacitors in each pair are eliminated from the sensing circuit.

The length of inner element 24 (left to right in the figure) is shown extended to provide three sections. The center section 56 is the "sensing" section. The other two sections 58 and 60 are the "rebalancing" and the "correction" sections. They are optional, but have significant benefits. The rebalancing section 58 is shown at the right end of plate element 24 in the figure; and the correction section 60 is shown at the left end of plate element 24. The electrodes in the rebalancing section are designated 52a and 54a; the electrodes in the correction section are designated 52b and 54b.

The primary purpose of the rebalancing section is to permit operating the gyro in a closed-loop mode, which greatly increases the maximum rate detectable, and significantly reduces the detection time required. In an open-loop mode, plate 24 is free to move whenever a Coriolis force is generated. The amplitude of the plate's movement is the measure of the rate. In a closed-loop mode, plate 24 is actively maintained in a known position (null), through the use of feedback and of a mechanism for forcing the plate 24 into the null position. In closed-loop mode, the electrical voltage (or current) necessary to counteract the Coriolis force becomes the measure of rate. In operation, an electrical potential is applied to the rebalancing electrodes 52a and 54a, and to the plate 24. The voltage necessary to maintain the plate 24 in the null position is controlled, based on the feedback from the main sensing electrodes 52 and 54.

The combination of the sensing electrodes 52 and 54 and the rebalancing electrodes 52a and 54a also provides a means for self-testing of the micro-gyro. To do so, the rebalancing electrodes 52a and 54a are intentionally injected with a voltage that moves the plate 24. The resulting movement can be verified with the sensing electrodes 52 and 54. The measured change, for example in capacitance value, can be compared to memory-stored data re the acceptable values obtained during calibration. In this manner, the sensor can be tested at the start of every application. The self-testing capability is particularly crucial for applications where high reliability and safety are involved.

The primary purpose of the correction section, with its electrodes 52b and 54b, is to correct for any cross-axis coupling problems due to any manufacturing imprecision. For example, the outer ring element 20, due to manufacturing and electronic errors, may not oscillate in a direction exactly orthogonal to the motion of plate 24. The small lateral forces generated by this manufacturing imprecision will be transferred to the plate 24, and will be detected, erroneously, as a Coriolis force. This cross-coupling error signal can be significantly larger than the Coriolis force, and can be removed by synchronous demodulation or other signal processing techniques known to those skilled in the art. In this preferred embodiment, the solution is to actively suppress the error signal by driving the plate 24 electrostatically with a force that is equal, but opposite in direction, to the error signal. The correction electrodes 52b and 54b provide a force to offset the force due to imbalance from the drive element.

Another application of the correction electrodes 52b and 54b is for frequency matching. By providing a small force opposing the movement of plate 24, the resonant frequency of the plate can be adjusted.

The vibration (oscillation) of outer element 20 should be at its resonant frequency. And the inner and outer elements 20 and 24 should be so designed that, when inner element 24 is vibrating due to Coriolis force: (a) it will also be vibrating at its resonant frequency, and (b) the inner and outer elements will be vibrating at the same frequency. Operating at or near resonant frequency, and matching the frequencies of the inner element 24 and outer element 20, causes amplification of the small Coriolis signal, and permits its effective measurement.

Figure 6:
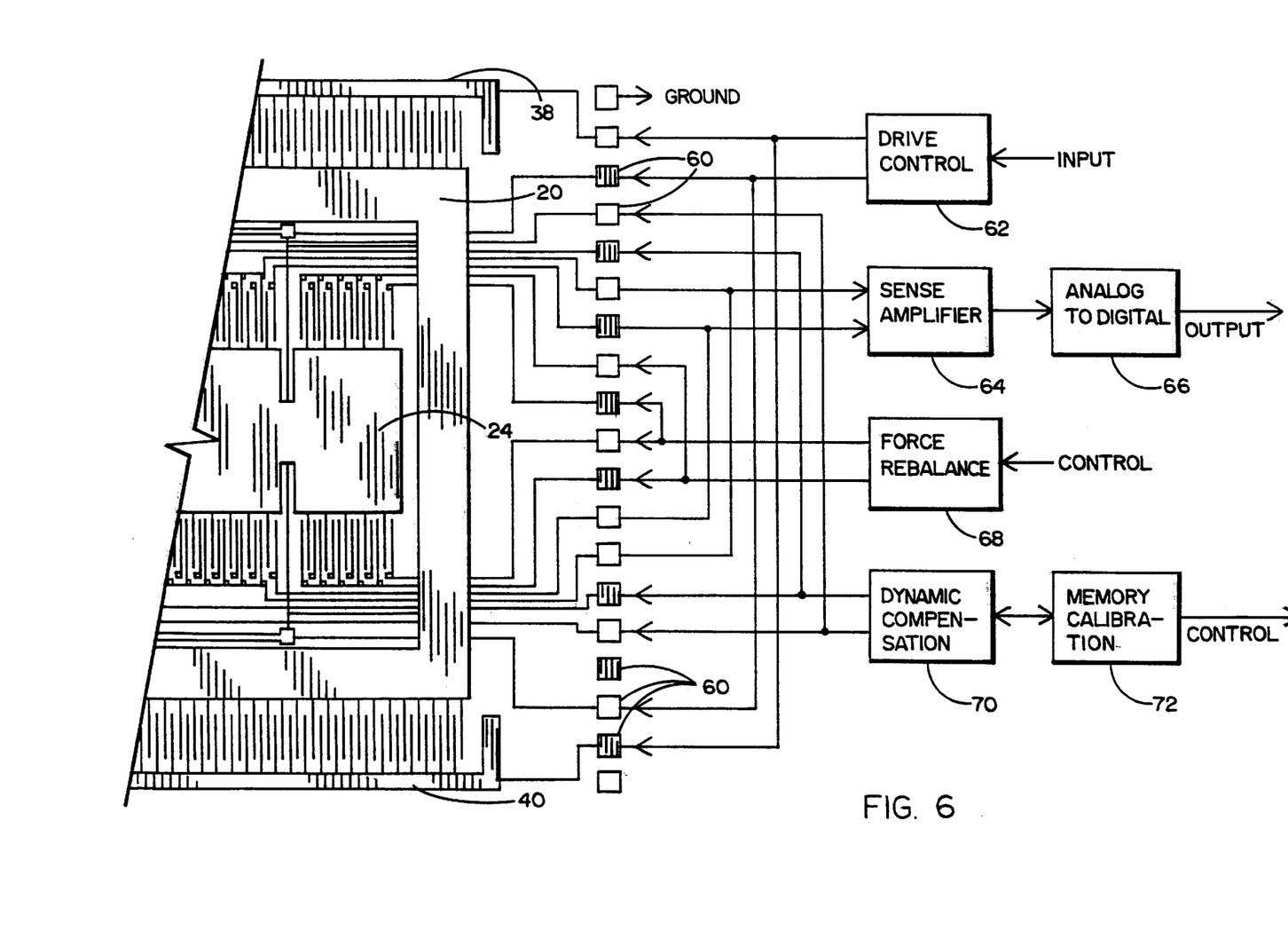
FIG. 6 shows a block diagram of the external circuitry and its connections to terminals on the micro-gyro substrate.
Figure 7:
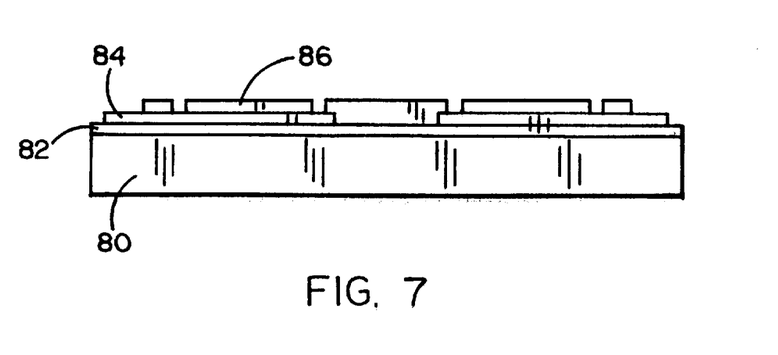
FIGS. 7–10 show the micro-gyro in four stages of the single-layer manufacturing process.
Figure 8:
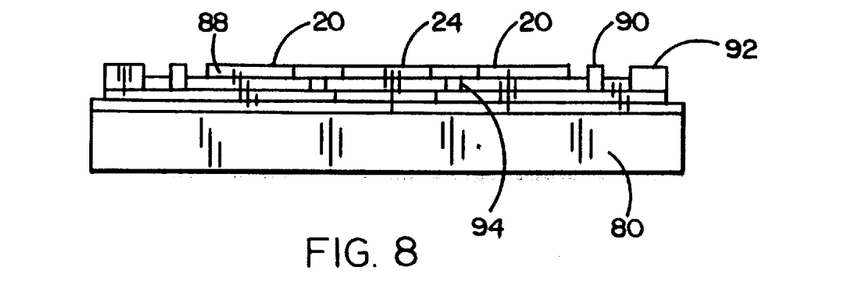
Figure 9:
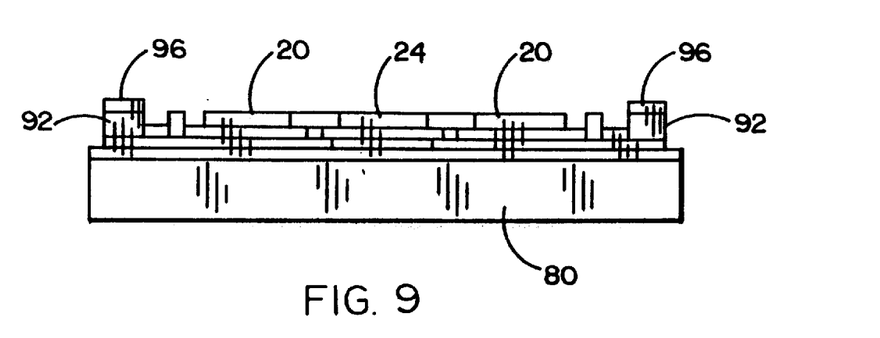
Figure 10:
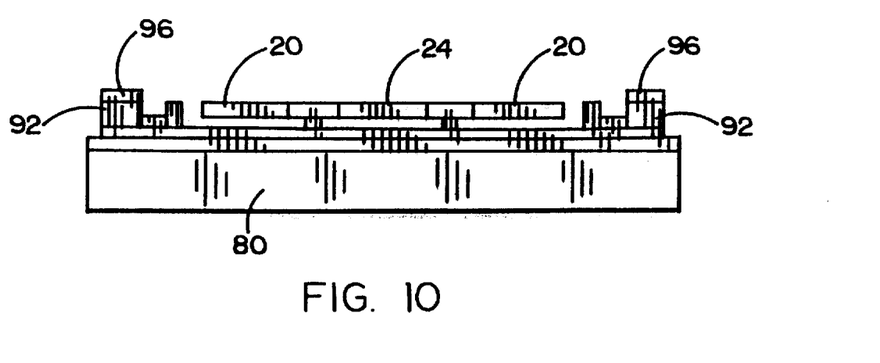

FIG. 2 is a detailed plan view which includes the electrical connecting lines, in addition to the mechanical elements of the micro-gyro. FIG. 6 shows a cut-off portion of FIG. 2, combined with a block diagram of the circuitry applicable to driving and sensing the micro-gyro elements. A series of terminals 60 are mounted on the substrate 24, with connecting lines extending to the gyro elements, and to the external electronic units. A drive block 62 contains the circuitry to drive the electrodes with different potentials. A sensing amplifier 64 receives signals from the sensing electrodes, and amplifies, filters, and buffers the signals. The resulting analog signals are then converted into digital format through an A/D converter block 66. A force rebalancing block 68 receives the position information regarding the plate and, depending on the control signal, provides a counterbalancing voltage to rebalance the plate into a null position. A dynamic compensation block 70 contains the circuitry to correct for unbalances due to manufacturing errors. The values of corrections are taken from a memory 72 stored during initial sensor calibration. In addition to manufacturing tolerances, other parameters, such as those due to temperatures, acceleration sensitivity and pressure, can also be included. The design of these electronic circuits is known to those skilled in the art of micro systems engineering.

As stated in the Summary, the present invention is preferred over certain prior art micro-gyros because it permits manufacturing the gyro elements as a single layer formed by deposition of material on the substrate, followed by photolithography steps, e.g., masking, developing, and etching, to define and suspend the gyro movable elements. A major source of error that affects the performance of micro-gyros whose operation is based on linear momentum is generally referred to as "quadrature error". This error originates from the misalignment between the motions of the drive and response elements. To generate the momentum, the drive element is subjected to an oscillating force. This force is directed along the first linear direction (Y-direction); and the response due to Coriolis force is sensed along a second linear direction (X-direction), which is oriented orthogonally to the first linear direction. Due to manufacturing imperfections, a small fraction of the driving force will be coupled from the drive motion into the response motion, thus creating an error signal that will ultimately limit the performance of linear momentum gyros. The quadrature error is exacerbated by the fact that a typical oscillating force is about 100 thousand to 1 million times larger than the minimum Coriolis forces. This means that the alignment accuracy between drive and sense axes needs to be better than 1 part in 100,000 (or 1 million) to reduce the error signal equal to the anticipated rotational rate signal. This stringent manufacturing tolerance is virtually unachievable. Although quadrature error can be reduced by techniques such as position feedback compensation, and synchronous demodulation, the best strategy is to reduce quadrature error by minimizing alignment error.

The single-layer design of the present invention requires only one patterning and etching process; in other words, the drive and sense elements are formed simultaneously in a single patterning and etching process. The single photolithography process drastically improves the alignment accuracy. In addition, by reducing the number of processing steps and the number of photolithography masks required, this gyro can be produced at significantly lower cost. Furthermore, with single layer processing, this gyro can cope with relatively greater manufacturing tolerances. The single-layer manufacturing process is feasible because of: (a) the opening in the center of the driving element 20 to accommodate the sensing element 24; (b) the intersecting construction of the flexures 36 and 32; and (c) the location of mounting anchors 30 inside the driving element 20.

FIGS. 7–10 show the micro-gyro construction in four stages of the single-layer manufacturing process. A suitable substrate material is silicon, which can be used in wafer form to manufacture a multiplicity of micro-gyro devices in a single process. The process begins with doping silicon wafers 80 with phosphorous to reduce charge feedthrough to the substrate from the electrostatic devices on the surface. Next, a layer 82 of 500 nm thick silicon nitrite is deposited on the wafer surface to provide electrical isolation. Next, a 500 nm polysilicon film 84 is deposited on top of the silicon nitrite. The polysilicon film 84 is patterned using photolithography, and then etched to produce the electrodes and electrical traces for interconnection. A sacrificial layer 86 is deposited using 2000 nm of phosphosilicate glass. The sacrificial layer is later removed at the end of the process to provide a free space to allow vertical motion of the microgyro. The sacrificial layer 86 is patterned to provide access for connection between the polysilicon film 84 and the next structural layer.

A layer 88 of polysilicon 2000 nm thick is deposited over the sacrificial layer 86. The layer 88 will serve as the structural layer that forms the moving parts of the micro gyro. In the same photolithography, all major structures are formed. These structures include the drive element 20, the sense element 24, the electrostatic comb drives 90, the wire bond pads 60, and any spacers 92 used to support the entire structure. The final deposition is a 500 nm metal layer 94 (typically gold or aluminum) used for electrical contact. Photolithography will limit the metal so that it remains only on the wire bond pads 60. The last process step involves dissolving the sacrificial layer 86 in multiple solutions of acid and deionized water. The structure is then rinsed in alcohol and dried in an oven. After drying, the wafer is diced into individual devices.

Figure 11:
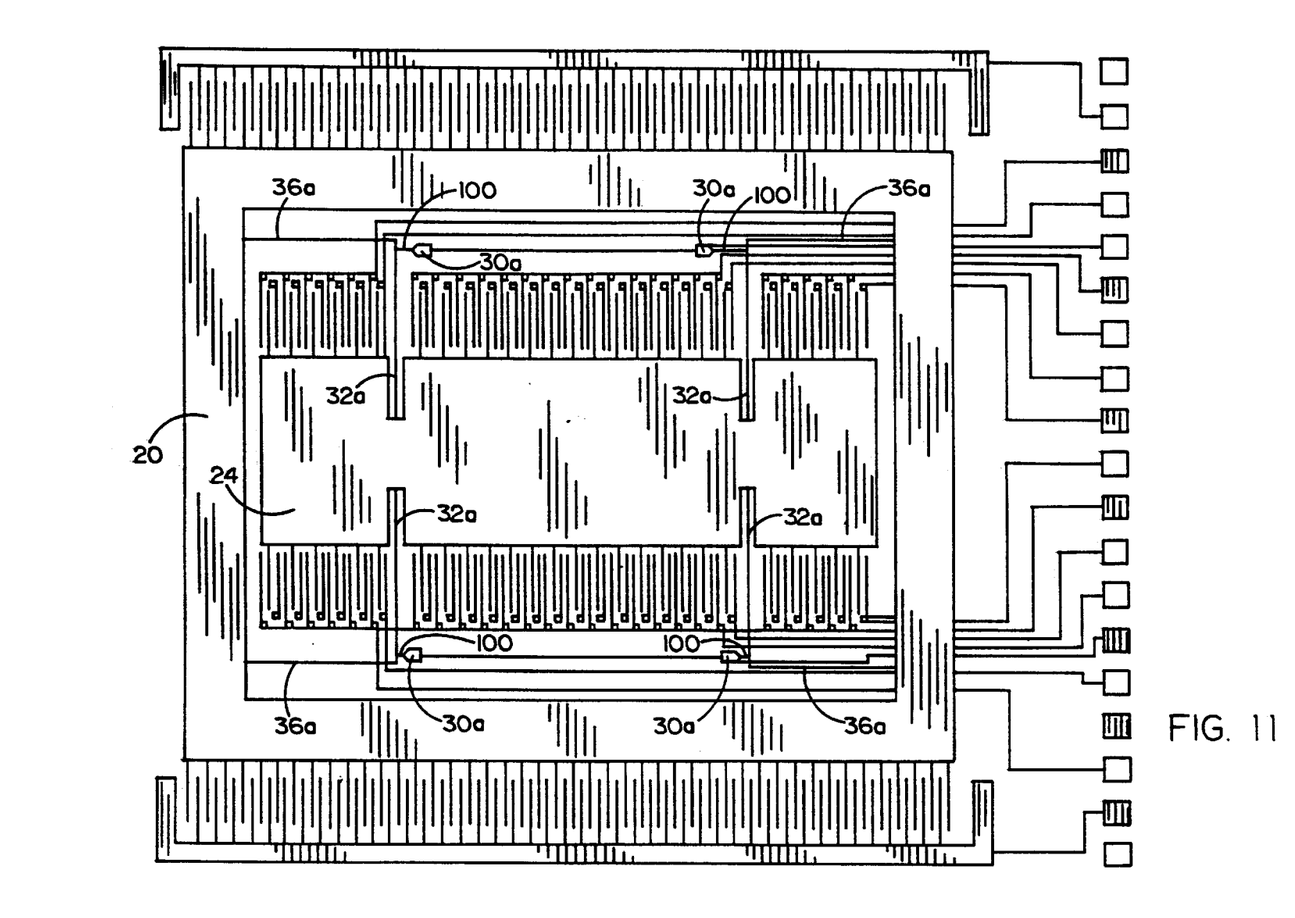
FIG. 11 is a plan view of a different embodiment of the micro-gyro.

FIG. 11 is a plan view of a different embodiment of the micro-gyro. It's differences are in the structures of the four anchors (designated 30a) and of the interconnected flexures (designated 32a and 36a). The structure of FIG. 11 permits a more compact micro-gyro design, because the interconnection of each outer-element-supporting flexure 36a with its corresponding inner-element-supporting flexure 32a is located at the end of flexure 32a, which lies beyond its supporting point at anchor 30a. The connection of flexures 36a and 32a is L-shaped, instead of T-shaped, as shown in FIGS. 1 and 2. In order to accommodate this interconnection of flexures 36a and 32a, and the transmission of Coriolis force from 36a to 32a, each anchor 30a has a very small tip 100 which provides a slightly flexible hinge between flexure 32a and its anchor 30a.

Figure 12:
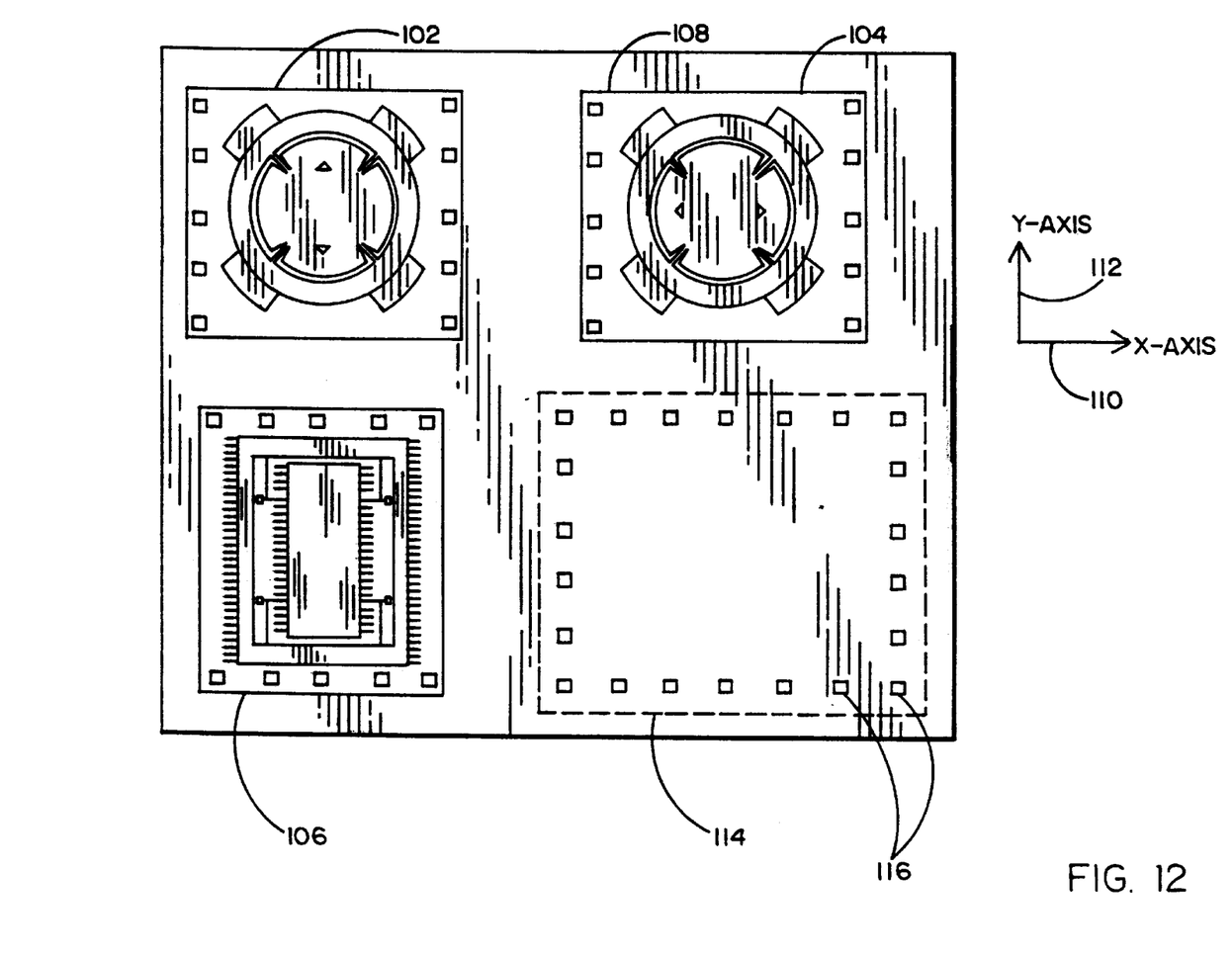
FIG. 12 is a plan view of three micro-gyros formed by simultaneous manufacture on a single substrate.

FIG. 12 shows a micro-gyro combination having universal responsiveness to rate axis motions, i.e., capable of sensing the angular motion of the gyro package in any one of its three orthogonal axes, X, Y, and Z. Three micro-gyros 102, 104 and 106 are combined in a single planar structure, all mounted on the same substrate, and all formed simultaneously with the process steps of material deposition, photolithography, and etching. The practical benefits are significant. An efficient manufacturing process, which is both more precise and less costly than other processes, provides, in a single plane, a compact micro-gyro structure capable of sensing motion in any of the three orthogonal axes.

This design combines three micro-gyros on a single silicon chip to result in full three-axis sensing capability. This is accomplished by using the following arrangement: on a silicon substrate 108 are formed: a first micro-gyro 102 having its sensing axis lying on the plane of the chip, oriented such that its sensing axis is aligned with the X-axis 110; a second micro-gyro 104 rotated 90 degrees with respect to the first micro-gyro 102, with its sensing axis lying on the plane of the chip, aligned with the Y-axis 112; and a third micro-gyro 106 whose sensing axis (Z-axis) is perpendicular to the plane of the chip. Only two types of gyros are used. The X- axis and Y-axis gyros are identical, and differ only in orientation.

The electronics for the gyros can also be integrated onto the same substrate 108. The electronics 114 are shown in the form of integrated circuits. The substrate 108 thus serves as a support for the gyros 102, 104, and 106, and also as a routing board providing electrical interconnections between the gyros, the electronics 114, and the bond pads 116. The method of integration of silicon sensors and integrated circuits is a well-established process for those skilled in the art of micromachines.

Other methods of integration are also possible. The substrate 108 can be a standard multi-layer circuit board, and the gyros and the integrated circuit can be components that are attached to this board. Methods of attachment include adhesive mounting combined with wire bonding, or flip-chip bonding (where the devices are bonded up-side down). The circuit board material can be either polymeric, ceramic, or silicon.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A micro-gyro device for detecting rotational movenent about an input axis, comprising:

a driving element which has back-and-forth vibrations along a straight-line drive axis, in order to generate Coriolis force in response to movement about the input axis, said force being exerted in a direction which is perpendicular to the drive axis, said driving element vibrating at or near its resonant frequency in the drive direction;

a sensing element which receives Coriolis force from the driving element, said sensing element under Coriolis force vibrating at or near its resonant frequency in a sensing direction, which frequency is substantially similar to the resonant frequency of the driving element in the drive direction, in order to enhance transfer of Coriolis force from the driving element to the sensing element;

said driving element having a resonant frequency in the sensing direction which is substantially different from the resonant freguency of the sensing element in the sensing direction; and linking means connecting the driving element to the sensing element to transfer Coriolis force, said linking means permitting the mass of the driving element and the mass of the sensing element to be substantially separated from one another except for transfer of Coriolis force, so that vibrating motion of the driving element in the drive direction does not cause substantial motion of the sensing element in the drive direction; and vibrating motion of the sensing element in the sensing direction does not cause substantial motion of the driving element in the sensing direction.

2. The micro-gyro device of claim 1 in which:

the driving and sensing elements are movable in the same plane; and the entire micro-gyro device is adapted to vibrate, due to rotational forces on the device, around a rate axis perpendicular to said plane.

3. The micro-gyro device of claim 2 which includes:

a substrate element which supports both the driving and sensing elements; and electrodes on the substrate element which are used in measuring the Coriolis force which acts on the sensing element.

4. The micro-gyro device of claim 3 in which one or more electrodes on the substrate respond to the Coriolis force acting on the sensing element during operation of the micro-gyro device, and one or more of the electrodes on the substrate are adapted to provide a balancing force which maintains the sensing element essentially in a null position.

5. The micro-gyro device of claim 4 in which the same electrodes used to provide balancing force during the measuring of Coriolis force also provide self-testing of the micro-gyro prior to operation, in response to an injected test voltage.

6. The micro-gyro device of claim 4 which also includes:
one or more electrodes on the substrate which are adapted to provide a correction force on the sensing element which compensates for imbalances due to manufacturing imprecision.

7. The micro-gyro device of claim 2 in which the driving element is an outer element having an open center, and the sensing element is an inner element located in said open center.

8. The micro-gyro device of claim 3 in which the driving element is an outer element having an open center, and the sensing element is an inner element located in said open center.

9. The micro-gyro device of claim 8 in which:
a plurality of anchors are supported on the substrate between the inner element and the outer element; and
each anchor supports a first flexure which is connected to the inner element, and a second flexure which is connected to the outer element.

10. The micro-gyro device of claim 9 in which the number of anchors is four, and the number of flexures is at least eight, at least two of which are associated with each anchor.

11. The micro-gyro device of claim 10 in which:
the outer-element-connected flexure is connected to the inner-element-connected flexure in order to transmit Coriolis force to the inner element.

12. The micro-gyro device of claim 11 in which the outer-element-connected and inner-element connected flexures are connected to one another between the anchor and the inner element.

13. The micro-gyro device of claim 11 in which the outer-element-connected and inner-element-connected flexures are connected to one another at the end of the inner-element-connected flexure beyond its anchor connection.

14. A micro-gyro device which is an essentially planar device adapted to measure rate of motion of the device around an axis perpendicular to the planar device, comprising:
a driving element which vibrates along a first axis parallel to the plane of the micro-gyro, in order to generate perpendicular Coriolis force to measure motion of the micro-gyro device;
a sensing element which vibrates under the effect of said Coriolis force;
said sensing element constituting the primary mass which is driven by the Coriolis force; and
linking means, for transmitting Coriolis energy from the driving element to the sensing element, in response to motion of the micro-gyro device around its axis perpendicular to the planar device;
said linking means permitting the driving element and sensing element to be substantially separated from one another except for transfer of Coriolis force, so that vibrating motion of the driving element in the driving direction does not cause substantial motion of the sensing element in the driving direction, and vibrating motion of the sensing element in the sensing direction does not cause substantial motion of the driving element in the sensing direction.

15. The micro-gyro of claim 14 in which the driving element is an outer element having an open center, and the sensing element is an inner element located in said open center.

16. The micro-gyro of claim 15 in which:
a plurality of supporting anchors are located between the inner element and the outer element; and
each anchor supports a first flexure which is connected to the inner element, and a second flexure which is connected to the outer element.

17. The micro-gyro of claim 16 in which the outer-element-connected flexure is connected to the inner-element-connected flexure in order to transmit Coriolis energy to the inner element.

18. The micro-gyro of claim 17 in which the inner-element-connected and outer-element-connected flexures are connected to one another between the anchor and the inner element.

19. The micro-gyro of claim 17 in which the inner-element-connected and outer-element-connected flexures are connected to one another at the end of the inner-element-connected flexure beyond its anchor connection.

20. A micro-gyro device which has its moving elements in the same plane and which measures its angular speed around a rate axis perpendicular to said plane, comprising:
a supporting substrate;
a driving element which is supported by and suspended above said substrate, and which is adapted to oscillate on an axis extending in a first direction in the micro-gyro plane to provide a driving mass;
a sensing element which is supported by and suspended above said substrate, and which is adapted to receive Coriolis force from the driving element when micro-gyro motion around the rate axis occurs, which Coriolis force is in a second direction perpendicular to the first direction and also is in the micro-gyro plane;
an anchor mounted on the substrate;
a first flexure supporting the sensing element, said first flexure having its first end secured to the anchor, and having its second end secured to the sensing element, so that the sensing element is able to oscillate as the second end of the first flexure moves; and
a second flexure supporting the driving element, said second flexure having its first end secured to the first flexure in order to permit transfer of Coriolis force, and having its second end secured to the driving element a substantial distance from the anchor, so that the driving element is able to oscillate as the second end of the second flexure moves.

21. The micro-gyro device of claim 20 in which the driving element and the sensing element are each supported by a plurality of flexures.

22. The micro-gyro of claim 20 in which the elements supported by the substrate are formed simultaneously as a layer on the substrate by successive steps of depositing material, delineating desired material shapes by photolithography, and etching to remove unwanted material.

* * * * *

UNITED STATES PATENT AND TRADEMARK OFFICE
CERTIFICATE OF CORRECTION

PATENT NO. : 6,089,089  
APPLICATION NO. : 09/301847  
DATED : July 18, 2000  
INVENTOR(S) : Ying W. Hsu Page 1 of 1

It is certified that error appears in the above-identified patent and that said Letters Patent is hereby corrected as shown below:

IN THE SPECIFICATION:

Please remove the paragraph at Column 1, Lines 3-7.

Signed and Sealed this

Third Day of March, 2009

JOHN DOLL
*Acting Director of the United States Patent and Trademark Office*